(12) United States Patent
Shelton et al.

(10) Patent No.: US 8,660,194 B2
(45) Date of Patent: *Feb. 25, 2014

(54) DVC DELTA COMMANDS

(75) Inventors: Gary William Shelton, Huntsville, AL (US); William Lazenby, Madison, AL (US); Michael Potter, Huntsville, AL (US)

(73) Assignee: Avocent Corporation, Huntsville, AL (US)

(*) Notice: Subject to any disclaimer, the term of this patent is extended or adjusted under 35 U.S.C. 154(b) by 291 days.

This patent is subject to a terminal disclaimer.

(21) Appl. No.: 12/458,818

(22) Filed: Jul. 23, 2009

(65) Prior Publication Data

US 2009/0290647 A1    Nov. 26, 2009

Related U.S. Application Data

(63) Continuation of application No. 11/790,994, filed on Apr. 30, 2007, now Pat. No. 7,782,961.

(60) Provisional application No. 60/795,577, filed on Apr. 28, 2006.

(51) Int. Cl.
H04N 7/12       (2006.01)
H04N 11/04      (2006.01)

(52) U.S. Cl.
USPC .................................. 375/240.26; 348/416.1

(58) Field of Classification Search
USPC ......... 348/384, 415, 416, 391, 393, 394, 417, 348/418, 409, 420, 408; 382/56, 232, 233, 382/236, 245, 253, 239, 238, 240; 375/240.01–240.26
See application file for complete search history.

(56) References Cited

U.S. PATENT DOCUMENTS

| | | | |
|---|---|---|---|
| 3,710,011 | A | 1/1973 | Altemus et al. |
| 3,925,762 | A | 12/1975 | Heitlinger et al. |
| 3,935,379 | A | 1/1976 | Thornburg et al. |
| 4,005,411 | A | 1/1977 | Morrin, II |
| 4,134,133 | A | 1/1979 | Teramura et al. |
| 4,142,243 | A | 2/1979 | Bishop et al. |
| 4,369,464 | A | 1/1983 | Temime |
| 4,384,327 | A | 5/1983 | Conway et al. |
| 4,667,233 | A | 5/1987 | Furukawa |

(Continued)

FOREIGN PATENT DOCUMENTS

| | | |
|---|---|---|
| EP | 0395416 | 10/1990 |
| EP | 0495490 | 7/1992 |

(Continued)

OTHER PUBLICATIONS

Chinese Appln. No. 03816346.2—Jul. 6, 2011 SIPO Office Action (Translation).

(Continued)

*Primary Examiner* — Behrooz Senfi
(74) *Attorney, Agent, or Firm* — Davidson Berquist Jackson & Gowdey

(57) ABSTRACT

A video compression system compresses video frames comprising pixels defined by n-bit color values. Encoder of video compression system determines the difference between a current pixel value and a plurality reference pixel values. Encoder sends difference value to decoder. Decoder determines current pixel value by adjusting a reference pixel color value by delta value.

8 Claims, 15 Drawing Sheets

(56) References Cited

U.S. PATENT DOCUMENTS

Figure 1:
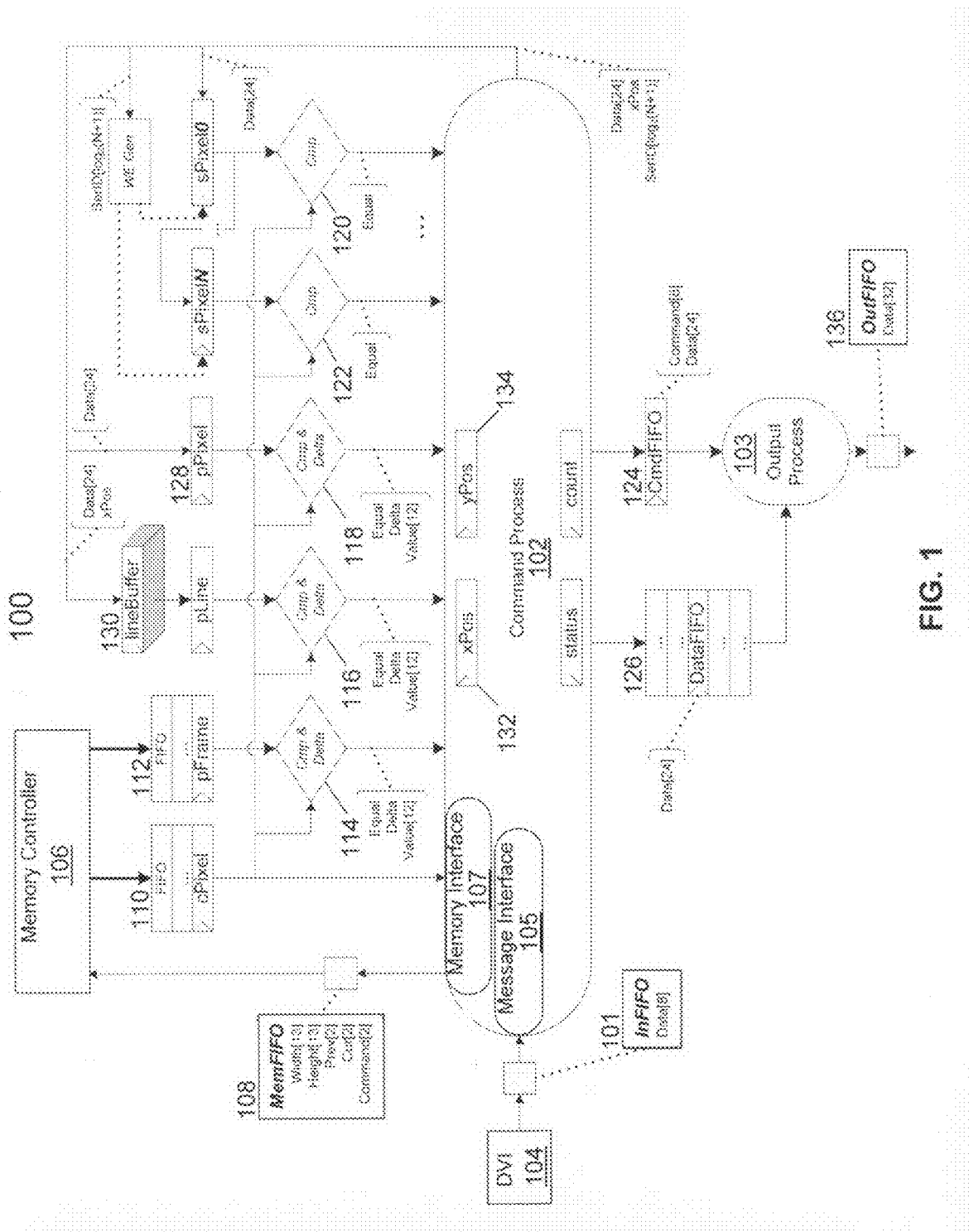

| | | |
|---|---|---|
| 4,764,769 A | 8/1988 | Hayworth et al. |
| 4,774,587 A | 9/1988 | Schmitt |
| 4,855,825 A | 8/1989 | Santamaki et al. |
| 4,873,515 A | 10/1989 | Dickson |
| 4,959,833 A | 9/1990 | Mercola et al. |
| 5,046,119 A | 9/1991 | Hoffert et al. |
| 5,083,214 A | 1/1992 | Knowles |
| 5,235,595 A | 8/1993 | O'Dowd |
| 5,251,018 A | 10/1993 | Jang et al. |
| 5,325,126 A | 6/1994 | Keith |
| 5,339,164 A | 8/1994 | Lim |
| 5,418,952 A | 5/1995 | Morley et al. |
| 5,430,848 A | 7/1995 | Waggener |
| 5,465,118 A | 11/1995 | Hancock et al. |
| 5,497,434 A | 3/1996 | Wilson |
| 5,519,874 A | 5/1996 | Yamagishi et al. |
| 5,526,024 A | 6/1996 | Gaglianello et al. |
| 5,566,339 A | 10/1996 | Perholtz et al. |
| 5,572,235 A | 11/1996 | Mical et al. |
| 5,630,036 A | 5/1997 | Sonohara et al. |
| 5,659,707 A | 8/1997 | Wang et al. |
| 5,664,029 A | 9/1997 | Callahan et al. |
| 5,664,223 A | 9/1997 | Bender et al. |
| 5,721,842 A | 2/1998 | Beasley et al. |
| 5,731,706 A | 3/1998 | Koeman et al. |
| 5,732,212 A | 3/1998 | Perholtz et al. |
| 5,754,836 A | 5/1998 | Rehl |
| 5,757,973 A | 5/1998 | Wilkinson |
| 5,764,479 A | 6/1998 | Crump et al. |
| 5,764,924 A | 6/1998 | Hong |
| 5,764,966 A | 6/1998 | Mote, Jr. |
| 5,781,747 A | 7/1998 | Smith et al. |
| 5,796,864 A | 8/1998 | Callahan |
| 5,799,207 A | 8/1998 | Wang et al. |
| 5,805,735 A | 9/1998 | Chen et al. |
| 5,812,169 A | 9/1998 | Tai et al. |
| 5,812,534 A | 9/1998 | Davis et al. |
| 5,828,848 A | 10/1998 | MacCormack et al. |
| 5,844,940 A | 12/1998 | Goodson et al. |
| 5,861,764 A | 1/1999 | Singer et al. |
| 5,864,681 A | 1/1999 | Proctor et al. |
| 5,867,167 A | 2/1999 | Deering |
| 5,870,429 A | 2/1999 | Moran et al. |
| 5,898,861 A | 4/1999 | Emerson et al. |
| 5,946,451 A | 8/1999 | Soker |
| 5,948,092 A | 9/1999 | Crump et al. |
| 5,967,853 A | 10/1999 | Hashim |
| 5,968,132 A | 10/1999 | Tokunaga et al. |
| 5,997,358 A | 12/1999 | Adriaenssens et al. |
| 6,003,105 A | 12/1999 | Vicard et al. |
| 6,008,847 A | 12/1999 | Bauchspies |
| 6,012,101 A | 1/2000 | Heller et al. |
| 6,016,316 A | 1/2000 | Moura et al. |
| 6,032,261 A | 2/2000 | Hulyalkar |
| 6,038,346 A | 3/2000 | Ratnakar |
| 6,040,864 A | 3/2000 | Etoh |
| 6,055,597 A | 4/2000 | Houg |
| 6,060,890 A | 5/2000 | Tsinker |
| 6,065,073 A | 5/2000 | Booth |
| 6,070,214 A | 5/2000 | Ahern |
| 6,084,638 A | 7/2000 | Hare et al. |
| 6,094,453 A | 7/2000 | Gosselin et al. |
| 6,097,368 A | 8/2000 | Zhu et al. |
| 6,124,811 A | 9/2000 | Acharya |
| 6,134,613 A | 10/2000 | Stephenson et al. |
| 6,146,158 A | 11/2000 | Peratoner et al. |
| 6,154,492 A | 11/2000 | Araki et al. |
| 6,195,391 B1 | 2/2001 | Hancock et al. |
| 6,202,116 B1 | 3/2001 | Hewitt |
| 6,233,226 B1 | 5/2001 | Gringeri |
| 6,240,481 B1 | 5/2001 | Suzuki |
| 6,240,554 B1 | 5/2001 | Fenouil |
| 6,243,496 B1 | 6/2001 | Wilkinson |
| 6,304,895 B1 | 10/2001 | Schneider et al. |
| 6,327,307 B1 | 12/2001 | Brailean et al. |
| 6,345,323 B1 | 2/2002 | Beasley et al. |
| 6,360,017 B1 | 3/2002 | Chiu et al. |
| 6,370,191 B1 | 4/2002 | Mahant-Shetti et al. |
| 6,373,890 B1 | 4/2002 | Freeman |
| 6,377,313 B1 | 4/2002 | Yang et al. |
| 6,377,640 B2 | 4/2002 | Trans |
| 6,404,932 B1 | 6/2002 | Hata et al. |
| 6,418,494 B1 | 7/2002 | Shatas et al. |
| 6,425,033 B1 | 7/2002 | Conway et al. |
| 6,453,120 B1 | 9/2002 | Takahashi |
| 6,470,050 B1 | 10/2002 | Ohtani et al. |
| 6,496,601 B1 | 12/2002 | Migdal et al. |
| 6,512,595 B1 | 1/2003 | Toda |
| 6,516,371 B1 | 2/2003 | Lai et al. |
| 6,522,365 B1 | 2/2003 | Levantovsky et al. |
| 6,539,418 B2 | 3/2003 | Schneider et al. |
| 6,542,631 B1 | 4/2003 | Ishikawa |
| 6,567,464 B2 | 5/2003 | Hamdi |
| 6,571,393 B1 | 5/2003 | Ko et al. |
| 6,574,364 B1 | 6/2003 | Economidis et al. |
| 6,584,155 B2 | 6/2003 | Takeda et al. |
| 6,590,930 B1 | 7/2003 | Greiss |
| 6,661,838 B2 | 12/2003 | Koga et al. |
| 6,664,969 B1 | 12/2003 | Emerson et al. |
| 6,701,380 B2 | 3/2004 | Schneider et al. |
| 6,754,241 B1 | 6/2004 | Krishnamurthy et al. |
| 6,785,424 B1 | 8/2004 | Sakamoto |
| 6,829,301 B1 | 12/2004 | Tinker et al. |
| 6,833,875 B1 | 12/2004 | Yang et al. |
| 6,871,008 B1 | 3/2005 | Pintz et al. |
| 6,898,313 B2 | 5/2005 | Li et al. |
| 6,940,900 B2 | 9/2005 | Takamizawa |
| 6,972,786 B1 | 12/2005 | Ludwig |
| 7,006,700 B2 | 2/2006 | Gilgen |
| 7,013,255 B1 | 3/2006 | Smith, II |
| 7,020,732 B2 | 3/2006 | Shatas et al. |
| 7,031,385 B1 | 4/2006 | Inoue et al. |
| 7,085,319 B2 | 8/2006 | Prakash et al. |
| 7,093,008 B2 | 8/2006 | Agerholm et al. |
| 7,143,432 B1 | 11/2006 | Brooks et al. |
| 7,221,389 B2 | 5/2007 | Ahern et al. |
| 7,222,306 B2 | 5/2007 | Kaasila et al. |
| 7,272,180 B2 | 9/2007 | Dambrackas |
| 7,277,104 B2 | 10/2007 | Dickens et al. |
| 7,321,623 B2 | 1/2008 | Dambrackas |
| 7,336,839 B2 | 2/2008 | Gilgen |
| 7,373,008 B2 | 5/2008 | Clouthier et al. |
| 7,457,461 B2 | 11/2008 | Gilgen |
| 7,466,713 B2 | 12/2008 | Saito |
| 7,515,632 B2 | 4/2009 | Dambrackas |
| 7,515,633 B2 | 4/2009 | Dambrackas |
| 7,542,509 B2 | 6/2009 | Dambrackas |
| 7,609,721 B2 | 10/2009 | Rao et al. |
| 7,720,146 B2 | 5/2010 | Dambrackas |
| 7,782,961 B2 * | 8/2010 | Shelton et al. ........... 375/240.26 |
| 7,941,634 B2 | 5/2011 | Georgi et al. |
| 2001/0048667 A1 | 12/2001 | Hamdi |
| 2003/0005186 A1 | 1/2003 | Gough |
| 2003/0048943 A1 | 3/2003 | Ishikawa |
| 2003/0202594 A1 | 10/2003 | Lainema |
| 2003/0231204 A1 | 12/2003 | Haggie et al. |
| 2004/0017514 A1 | 1/2004 | Dickens et al. |
| 2004/0062305 A1 | 4/2004 | Dambrackas |
| 2004/0064198 A1 | 4/2004 | Reynolds et al. |
| 2004/0122931 A1 | 6/2004 | Rowland et al. |
| 2004/0228526 A9 | 11/2004 | Lin et al. |
| 2005/0005102 A1 | 1/2005 | Meggitt et al. |
| 2005/0025248 A1 | 2/2005 | Johnson et al. |
| 2005/0057777 A1 | 3/2005 | Doron |
| 2005/0069034 A1 * | 3/2005 | Dambrackas ........... 375/240.01 |
| 2005/0089091 A1 | 4/2005 | Kim et al. |
| 2005/0108582 A1 | 5/2005 | Fung |
| 2005/0135480 A1 | 6/2005 | Li et al. |
| 2005/0157799 A1 | 7/2005 | Raman et al. |
| 2005/0198245 A1 | 9/2005 | Burgess et al. |
| 2005/0231462 A1 | 10/2005 | Chen |
| 2005/0249207 A1 | 11/2005 | Zodnik |
| 2005/0286790 A1 | 12/2005 | Gilgen |
| 2006/0039404 A1 | 2/2006 | Rao et al. |

(56) References Cited

U.S. PATENT DOCUMENTS

| | | |
|---|---|---|
| 2006/0092271 A1 | 5/2006 | Banno et al. |
| 2006/0120460 A1 | 6/2006 | Gilgen |
| 2006/0126718 A1 | 6/2006 | Dambrackas et al. |
| 2006/0126720 A1 | 6/2006 | Dambrackas |
| 2006/0126721 A1 | 6/2006 | Dambrackas |
| 2006/0126722 A1 | 6/2006 | Dambrackas |
| 2006/0126723 A1 | 6/2006 | Dambrackas |
| 2006/0161635 A1 | 7/2006 | Lamkin et al. |
| 2006/0262226 A1 | 11/2006 | Odryna et al. |
| 2007/0019743 A1 | 1/2007 | Dambrackas |
| 2007/0165035 A1 | 7/2007 | Duluk et al. |
| 2007/0180407 A1 | 8/2007 | Vahtola |
| 2007/0248159 A1 | 10/2007 | Dambrackas |
| 2007/0253492 A1 | 11/2007 | Shelton et al. |
| 2009/0290647 A1 | 11/2009 | Shelton et al. |

FOREIGN PATENT DOCUMENTS

| | | |
|---|---|---|
| EP | 0780773 A1 | 6/1997 |
| EP | 0 844 567 | 5/1998 |
| EP | 0270896 | 6/1998 |
| EP | 0899959 | 3/1999 |
| GB | 2318956 | 6/1998 |
| GB | 2350039 | 11/2000 |
| GB | 2388504 | 11/2003 |
| JP | 64-077374 | 9/1987 |
| JP | 62-077935 | 10/1987 |
| JP | 63-108879 | 5/1988 |
| JP | 01-162480 | 6/1989 |
| JP | 01-303988 | 12/1989 |
| JP | H03-130767 | 4/1991 |
| JP | 3192457 | 8/1991 |
| JP | 6-77858 | 3/1994 |
| JP | H8-223579 | 2/1995 |
| JP | 08-033000 | 2/1996 |
| JP | 08-263262 | 10/1996 |
| JP | 09-233467 | 9/1997 |
| JP | 9-321672 | 12/1997 |
| JP | 11-308465 | 4/1998 |
| JP | 10-215379 | 8/1998 |
| JP | 10-257485 | 9/1998 |
| JP | 11-184800 | 7/1999 |
| JP | 11-184801 | 7/1999 |
| JP | 11-203457 | 7/1999 |
| JP | 11-308465 | 11/1999 |
| JP | 11-313213 | 11/1999 |
| JP | 2000-125111 | 4/2000 |
| JP | 2001-053620 | 2/2001 |
| JP | 2001-148849 | 5/2001 |
| JP | 2001-169287 | 6/2001 |
| JP | 2002-043950 | 2/2002 |
| JP | 2002-165105 | 6/2002 |
| JP | 2003-174565 | 6/2003 |
| JP | 2003-244448 | 8/2003 |
| JP | 2003-250053 | 9/2003 |
| JP | 2004-032698 | 1/2004 |
| JP | 2004-220160 | 8/2004 |
| TW | 589871 | 6/2004 |
| TW | I220036 | 8/2004 |
| WO | WO 97/41514 | 11/1997 |
| WO | WO 98/26603 | 6/1998 |
| WO | WO 98/54893 | 12/1998 |
| WO | WO 99/050819 | 10/1999 |
| WO | WO 01/22628 | 3/2001 |
| WO | WO 02/062050 A2 | 8/2002 |
| WO | WO 03/055094 | 7/2003 |
| WO | WO 03/071804 | 8/2003 |
| WO | WO 2004/032356 | 4/2004 |
| WO | WO 2004/081772 | 9/2004 |

OTHER PUBLICATIONS

CN Appln. No. 200710167085.2—Aug. 2, 2011 SIPO Office Action (with English Translation).
EP Appln. No. 03723915—Aug. 1, 2011 EPO Supplementary European Search Report.
EP Appln. No. 07776613—Jul. 25, 2011 EPO Supplementary European Search Report.
JP Appln. No. 2007-518071—Sep. 6, 2011 Decision of Rejection with statement of relevancy.
U.S. Appl. No. 12/801,293—Aug. 15, 2011 PTO Office Action.
CA Appln. No. 2,524,001—Aug. 30, 2010 CIPO Office Action.
International Search Report and Written Opinion mailed Sep. 14, 2010 in PCT Appln. No. PCT/US2010/001941.
Chinese Appln. No. 03816346.2—Jun. 12, 2009 SIPO Office Action (Translation).
Chrysafis et al., "Line-Based, Reduced Memory, Wavelet Image Compression," Mar. 2000 [retrieved on Aug. 20, 2008], Retrieved from the internet: <http://sipi.usc.edu/~ortega/Students/chrysafi/doc/ChristosChrysafis_line_based_I_P2000.pdf>.
CN Appln. No. 200710167085.2—Jun. 26, 2009 SIPO Office Action.
EP Appln. No. 03818864.5—May 8, 2009 EPO Office Action.
EP Appln. No. 03818864.5—Aug. 24, 2009 EPO Office Action.
IL Appln. No. 171878—Apr. 28, 2009 Translation of Office Action.
International Preliminary Examination Report in PCT Application No. PCT/US2003/030650, mailed Aug. 25, 2006.
International Search Report and Written Opinion mailed Sep. 4, 2008 in PCT/US07/10376.
Matsui et al., "High-speed Transmission of Sequential Freeze-pictures by Exchanging Changed Areas", IEEE Transactions on Communications, IEEE Service Center, Piscataway, NJ, vol. COM-29, No. 12, Dec. 1, 1981, XP002089584, ISSN: 0090-6778.
Office Action Issued Aug. 5, 2008 in Japanese Patent Application No. 2006-271932 (with English translation).
Office Action Issued Jul. 11, 2006, in Japanese Patent Application No. 2006-024444.
Office Action issued Jul. 31, 2007 in Japanese Patent Application No. 2006-024444 (with English translation).
Office Action Issued Jul. 4, 2006, in Japanese Patent Application No. 2006-024442.
Office Action Issued Jul. 4, 2006, in Japanese Patent Application No. 2006-024443.
Office Action Issued Mar. 7, 2006, in Japanese Patent Application No. 2004-541433 (with English translation).
Office Action Issued Mar. 7, 2006, in Japanese Patent Application No. 2006-024442 (with English translation).
Office Action Issued Mar. 7, 2006, in Japanese Patent Application No. 2006-024443 (with English translation).
Office Action Issued Mar. 7, 2006, in Japanese Patent Application No. 2006-024444 (with English translation).
Official Action issued Dec. 9, 2008 in JP Appln. No. 2005-510478 [with English translation].
PCT International Search Report and Written Opinion mailed Jan. 3, 2006 in PCT/US05/17626, International filed Jan. 3, 2006.
PCT International Search Report and Written Opinion mailed Oct. 25, 2005 in PCT/US05/19256, International filed Oct. 25, 2005.
PCT International Search Report for PCT/US03/10488, mailed Jul. 28, 2003.
PCT International Search Report in PCT Application No. PCT/US2003/030650 mailed Apr. 20, 2006.
Search Report and Written Opinion mailed Aug. 26, 2008 in PCT Appln. No. PCT/US2006/021182.
Thyagarajan K. S. et al., "Image Sequence Coding Using Interframe VDPCM and Motion Compensation", ICASSP, IEEE International Conference on Acoustics, Speech and Signal Processing-proceedings 1989 Publ. by IEEE, vol. 3, 1989, pp. 1858-1861, XP010082957.
U.S. Appl. No. 11/339,537—May 13, 2009 PTO Office Action.
U.S. Appl. No. 11/790,994—Jun. 2, 2009 PTO Office Action.
U.S. Appl. No. 11/819,047—Aug. 26, 2009 PTO Office Action.
U.S. Appl. No. 12/318,074—Sep. 14, 2009 PTO Office Action.
CA Appln. No. 2,627,037—Sep. 9, 2010 CIPO Office Action.
CN Appln. No. 200710167085.2—Aug. 6, 2010 SIPO Office Action.
JP Appln. No. 2007-098267—Jul. 27, 2010 JPO Notice of Reasons for Rejection with translation.
Supplementary European Search Report mailed Nov. 23, 2010 in EP Appln. No. 05756603.

(56) References Cited

OTHER PUBLICATIONS

CN Appln. No. 200710167085.2—Dec. 27, 2010 SIPO Office Action translation.
JP 2007-518071—Feb. 8, 2011 JIPO Office Action.
JP Appln. No. 2007-518086—Feb. 15, 2011 JPO Office Action.
U.S. Appl. No. 11/528,569—May 20, 2011 PTO Office Action.
U.S. Appl. No. 12/533,073—May 23, 2011 PTO Office Action.
JP Appln. No. 2007-518086—Jun. 21, 2011 JIPO Office Action.
CA Appln. No. 2,524,001—Nov. 30, 2009 CIPO Office Action.
IL Appln. No. 167787—Jul. 21, 2009 Office Action.
JP Appln. No. 2005-510478—Jul. 7, 2009 Notice of Reasons for Rejection [English translation].
JP Appln. No. 2006-271932—Oct. 6, 2009 Office Action with English summary.
U.S. Appl. No. 11/282,688—Apr. 28, 2010 PTO Office Action.
U.S. Appl. No. 11/790,994—Feb. 2, 2010 PTO Office Action.
CA Appln. No. 2,625,658—Oct. 12, 2011 CIPO Office Action.
JP Appln. No. 2007-098267—Oct. 11, 2011 JPO Final Notice of Reasons for Rejection.
U.S. Appl. No. 10/260,534, Oct. 1, 2002, Dambrackas.
U.S. Appl. No. 10/434,339, May 9, 2003, Dambrackas.
U.S. Appl. No. 10/629,855, Jul. 30, 2003, Johnson et al.
U.S. Appl. No. 10/875,678, Jun. 25, 2004, Gilgen.
U.S. Appl. No. 10/875,679, Jun. 25, 2004, Gilgen.
U.S. Appl. No. 11/282,688, Nov. 21, 2005, Dambrackas et al.
U.S. Appl. No. 11/339,537, Jan. 26, 2006, Dambrackas.
U.S. Appl. No. 11/339,541, Jan. 26, 2006, Dambrackas.
U.S. Appl. No. 11/339,542, Jan. 26, 2006, Dambrackas.
U.S. Appl. No. 11/340,476, Jan. 27, 2006, Dambrackas.
U.S. Appl. No. 11/528,569, Sep. 28, 2006, Dambrackas et al.
U.S. Appl. No. 11/707,863, Feb. 20, 2007, Hickey et al.
U.S. Appl. No. 11/707,879, Feb. 20, 2007, Hickey et al.
U.S. Appl. No. 11/707,880, Feb. 20, 2007, Hickey et al.
U.S. Appl. No. 11/819,047, Jun. 25, 2007, Dambrackas.
U.S. Appl. No. 11/889,268, Aug. 10, 2007, Hickey et al.
U.S. Appl. No. 60/774,186, Feb. 17, 2006, Hickey.
U.S. Appl. No. 60/795,577, Apr. 28, 2006, Shelton, Gary.
U.S. Appl. No. 60/836,649, Aug. 10, 2006, Hickey.
U.S. Appl. No. 60/836,930, Aug. 11, 2006, Hickey.
U.S. Appl. No. 60/848,488, Sep. 29, 2006, Hickey.
"Avocent Install and Discovery Protocol Specification," Version 1.3, Avocent Corporation Jul. 9, 2003 [30 pages].
"Avocent Secure Management Protocol Specification," Version 1.8, Avocent Corporation Apr. 8, 2005 [64 pages].
CA Appln. No. 2,382,403—Dec. 8, 2009 CIPO Office Action.
CA Appln. No. 2,476,102—Apr. 16, 2009 CIPO Office Action.
CA Appln. No. 2,676,794—Feb. 12, 2010 CIPO Office Action.
Digital Semiconductor 21152 PCI-to-PCI Bridge, Data Sheet, Feb. 1996, Digital Equipment Corporation, Maynard, Mass.
Duft et al. (ed.) "Xilinx Breaks One Million-Gate Barrier with Delivery of New Virtex Series", Press Kit, Xilinx, Oct. 1998.
EP Appln. No. 057756603.6—Nov. 23, 2010 EPO Supplementary Search Report.
European Office Action in European application 99960160.2, dated Mar. 16, 2006.
European Office Action in European Application No. 99960160.2-2212 dated Nov. 15, 2006.
Hill, T. "Virtex Design Methodology Using Leonardo Spectrum 1999.1", Applications Note, Exemplar Logic Technical Marketing, Apr. 1999, Rev. 3.0, pp. 1-47.
Hsieh et al "Architectural Power Optimization by Bus Splitting", Design, Automation and Test in Europe Conference and Exhibition 2000. Proceedings, pp. 612-616.
IBM Tech. Disc. Bull. "Procedure and Design to Facilitate", Apr. 1994, vol. 37, Issue 4B, pp. 215-216.
IBM Technical Disclosure Bulletin, "Multimedia System Packaging", Sep. 1993, vol. 36, Issue 9A, pp. 525-530.
IL Appln. No. 184058—Jul. 14, 2010 Ministry of Justice Commissioner of Patents Office Action with translation.

International Preliminary Examination Report in PCT application PCT/US2003/04707, mailed Oct. 1, 2004.
International Search Report and Written Opinion mailed Aug. 1, 2008 in PCT Application PCT/US05/46352.
International Search Report and Written Opinion mailed Jul. 29, 2008 in PCT Application PCT/US07/17700.
International Search Report relating to PCT/US03/04707 dated Jul. 11, 2003.
International Search Report, PCT/US99/25290 mailed Feb. 10, 2000.
International Search Report, PCT/US99/25291 mailed Feb. 7, 2000.
JP Appln. No. 2003-570573—Jul. 21, 2009 Office Action with English translation.
McCloghrie, K., "Management Information Base for Network Management of TCP/IP-based internets: MIB II," Network Working Group, Performance Systems International, Mar. 1991 [60 pages].
Mobility Electronics, Inc. Brochure for PCI Split Bridge, Scottsdale, AZ, 1999.
My Appln. No. PI20030508—Mar. 6, 2007 MyIPO Substantive Examination Adverse Report.
MY Appln. No. PI20056038—Sep. 11, 2009 MyIPO Substantive Examination Adverse Report.
My Appln. No. PI20056038—Aug. 30, 2010 MyIPO Substantive Examination Adverse Report.
My Appln. No. PI20062195—Sep. 11, 2009 MyIPO Adverse Examination Report.
Official Action mailed Feb. 6, 2008 in Japanese Application No. 2003-570573 [with English translation].
PCI Local Bus Specification, Revision 2.1, Jun. 1995, The PCI Special Interest Group, Portland, Oregon.
PCT Written Opinion in PCT application PCT/US2003/04707, mailed Mar. 4, 2004.
Schutti et al. "Data Transfer between Asynchronous Clock Domains without Pain", RIIC, SNUG Europe 2000, Rev. 1.1, Feb. 2000, pp. 1-12.
Search Report and Written Opinion mailed Jul. 16, 2008 in PCT Appln. No. PCT/US2007/17699.
Supplementary European Search Report dated Aug. 9, 2010 in EP Appln. No. 03709132.9.
U.S. Appl. No. 11/303,031—Apr. 29, 2009 PTO Office Action.
JP Appln. No. 2005-510478—Jul. 6, 2010 Decision of Rejection (English translation).
CA Appln. No. 2,630,532—Jul. 25, 2011 CIPO Office Action.
European Office Action in EP Appln. No. 057566036, dated Apr. 7, 2011 [6 pages].
U.S. Appl. No. 12/533,073—Mar. 9, 2011 PTO Office Action.
CN Appln. No. 03816346.2—Nov. 23, 2011 Office Action (with English translation).
U.S. Appl. No. 11/707,879—Nov. 28, 2011 PTO Office Action.
CA Appln. No. 2,571,478—Jan. 31, 2012 CIPO Office Action.
CA Appln. No. 2,625,462—Jan. 5, 2012 CIPO Office Action.
CA Appln. No. 2,625,658—Jun. 4, 2012 CIPO Office Action.
CA Appln. No. 2,630,532—Mar. 20, 2012 CIPO Office Action.
CA Appln. No. 2,650,663—Feb. 1, 2012 CIPO Office Action.
EP Appln. No. 05756603.6—Dec. 13, 2011 EP Office Action.
Extended European Search Report mailed Feb. 14, 2012 in EPO Appln. No. 05854984.1.
IL191529—Dec. 4, 2011 Ministry of Justice Commissioner of Patents Office Action with translation.
Official Letter mailed Mar. 16, 2012 in TW 94117242.
U.S. Appl. No. 11/889,525—Feb. 15, 2012 PTO Office Action.
"Lossless and Near-Lossless Coding of Continuous Tone Still Images (JPEG-LS)", ISO/IEC JTC1/SC29/WG1 FCD 14495—Public Draft, XX, XX Jul. 16, 1997, pp. I-IV, 1, XP002260316, Retrieved from the Internet: URL:http://www.jpeg.org/public/fcd14495p.pdf paragraphs [04.2], [04.4], [A.
CN Appln. No. 200910223192.1—May 10, 2012 SIPO Office Action with English translation.
EP Appln. No. 05754824.0—Jul. 6, 2012 EPO Supplementary Search Report.
EP Appln. No. 05754824.0—Sep. 14, 2012 EPO Office Action.
Kyeong Ho Yang et al: "A contex-based predictive coder for lossless and near-lossless compression of video", Image Processing, 2000.

(56) References Cited

OTHER PUBLICATIONS

Proceedings, 2000 International Conference on Sep. 10-13, 2000, IEEE, Piscataway, NJ, USA, vol. 1, Sep. 10, 2000 pp. 144-1.
MY Appln. No. PI20084298—Aug. 30, 2012 MyIPO Substantive Examination Adverse Report.
TW Appln. No. 94145077—May 17, 2012 Taiwanese Patent Office Official Letter.
CA 2,625,658—Jan. 14, 2013 CIPO Office Action.
CA Appln. No. 2,571,489—Jan. 24, 2013 CIPO Office Action.
EP Appln. No. 05854984.1—Mar. 1, 2013 EPO Office Action.
Official Letter and Search Report completed Nov. 19, 2012 in TW094117242.
Bowling, Carl D. et al., "Motion Compensated Image Coding with a Combined Maximum a Posteriori and Regression Algorithm," IEEE Transactions on Communications, New York, USA, vol. COM-33, No. 8, Aug. 1, 1985, pp. 844-857.
CA Appln. No. 2,630,532—Nov. 27, 2012 CIPO Office Action.
Cagnazzo, Marco et al., "Low-Complexity Scalable Video Coding through Table Lookup VQ and Index Coding," IDMS/PROMS 2002, LNCS 2515, pp. 166-175, 2002.
CN Appln. No. 200910223192.1—May 10, 2012 Office Action.
EP Appln. No. 03818864.5—Sep. 20, 2012 EPO Office Action.
EP Appln. No. 06849789.0—Oct. 23, 2012 Supplementary European Search Report.
Goldberg, Morris et al., "Image Sequence Coding Using Vector Quantization," IEEE Transactions on Communications., vol. COM-34, No. 7, Jul. 1986.
Official Letter mailed Sep. 17, 2012 in TW Appln. No. 95120039.
Puri, A. et al., "Motion-compensated transform coding based on block motion-tracking algorithm," International Conferences on Communications 1987, IEEE, pp. 136-140.

\* cited by examiner

Message Header

| Field | Width | Name | Description |
|---|---|---|---|
| 3...0 | 4 | Data | Type specific data.<br>StartFrame – Current FrameID in [5:4]<br>Clear control for End Frame (clear if set)<br>all other types – bytes to follow. |
| 7...4 | 4 | Type | Specifies the type of message:<br>0000 = none<br>0001 = Start Frame<br>0010 = End Frame<br>0011 = *Reserved*<br>0100 = Horizontal Timing<br>0101 = Vertical Timing<br>0110 = Pixel Clock Rate<br>0111 = *Reserved*<br>1*** = *Reserved* |

Horizontal Timing:

| Field | Width | Name | Description |
|---|---|---|---|
| 12...0 | 13 | ActiveData | Number of pixels of active data in a line (0-8191) |
| 21...13 | 9 | FrontPorch | Number of pixels in the front porch (0-511) |
| 30...22 | 9 | SyncPulse | Number of pixels in the sync pulse (0-511). |
| 39...31 | 9 | BackPorch | Number of pixels in the back porch (0-511). |

Vertical Timing:

| Field | Width | Name | Description |
|---|---|---|---|
| 12...0 | 13 | ActiveData | Number of lines of active data in a frame (0-8191) |
| 21...13 | 9 | FrontPorch | Number of lines in the front porch (0-511) |
| 30...22 | 9 | SyncPulse | Number of lines in the sync pulse (0-511). |
| 39...31 | 9 | BackPorch | Number of lines in the back porch (0-511). |

Video Pixel Clock Rate:

| Field | Width | Name | Description |
|---|---|---|---|
| 23...0 | 24 | PixelCount | The number of pixels per frame. |
| 47...24 | 24 | SampledCount | The number of pixels per frame as sampled by a known (60MHz) clock. |

FIG. 2

| Field | Width | Name | Description |
|---|---|---|---|
| 12…0 | 13 | *FrameWidth* | Frame width in terms of pixels. |
| 25…13 | 13 | *FrameHeight* | Frame height in terms of pixels. |
| 27…26 | 2 | *PreviousFrame* | ID of oldest frame to access (0-3). |
| 29…28 | 2 | *CurrentFrame* | ID of newest frame to access (0-3). |
| 31…30 | 2 | *Command* | Specifies the type of command:<br>00 = Request Frames<br>01 = Purge Frame<br>1* = *Reserved* |

FIG. 3

| Mode | Name | Description |
|---|---|---|
| 0 | Standard | `4-bit, range [-8,7]` |
| 1 | Truncated | 4-bit, range [0,15]. Useful for adding delta to previously truncated colors. |
| 2 | *Reserved* | |
| 3 | *Reserved* | |
| 4 | Packed3 | 3-bits, range [-4,3], type 1 packed. |
| 5 | PackedT3 | 3-bits, range [0,7], type 1 packed. |
| 6 | *Reserved* | |
| 7 | *Reserved* | |
| 8 | Packed3Cmd | 3-bits, range [-4,3], packed with type before each delta (type 2). |
| 9 | PackedT3Cmd | 3-bits, range [0,7], packed with command before each delta (type 2). |
| 10-15 | *Reserved* | |

FIG. 7

| DATA | 7 | 5 | 4 | 3 | | | 0 |
|---|---|---|---|---|---|---|---|
| | 001 | | 0 | | 0000 | | |
| | 15 | | | NumBytes = N | | | |
| | data[ 0] | | | | | | |
| | ... | | | | | | |
| | data[ N-1] | | | | | | |

FIG. 14

| Core Clock Rate (MHz) | | Frame Rate (fps) | | | | |
|---|---|---|---|---|---|---|
| Resolution | (width) (height) | 15 | 20 | 30 | 40 | 60 |
| VGA | 640 480 | 4.61 | 6.14 | 9.22 | 12.29 | 18.43 |
| SVGA | 800 600 | 7.2 | 9.6 | 14.4 | 19.2 | 28.8 |
| XGA | 1024 768 | 11.8 | 15.73 | 23.59 | 31.46 | 47.19 |
| SXGA | 1280 1024 | 19.66 | 26.21 | 39.32 | 52.43 | 78.64 |
| UXGA | 1600 1200 | 28.8 | 38.4 | 57.6 | 76.8 | 115.2 |
| HDTV | 1920 1080 | 31.1 | 47.19 | 62.21 | 82.94 | 124.42 |
| QXGA | 2048 1536 | 47.19 | 62.91 | 94.37 | 125.83 | 188.74 | almost possible at 2 clocks per pixel at a very high rate borderline for reasonable requires too high a clock rate

FIG. 15

DVC DELTA COMMANDS

CROSS-REFERENCE TO RELATED APPLICATIONS

This application is a continuation of U.S. patent application Ser. No. 11/790,994, filed Apr. 30, 2007, which claims priority to U.S. provisional application No. 60/795,577, filed Apr. 28, 2006 the entire contents of which are incorporated herein by reference.

This application is also related to the following co-pending U.S. patent application which is commonly owned with the present application, contents of which are incorporated herein by reference:
1. U.S. application Ser. No. 10/260,534 entitled "Video Compression System" filed on Oct. 1, 2002.

FIELD OF THE DISCLOSURE

This disclosure relates to a computer video compression system.

Introduction

A Video Compression Unit is disclosed herein that uses a compression scheme based on the directional algorithm concepts previously disclosed in application Ser. No. 10/260,534. That algorithm, so called "DVC encoding," is employed herein with some newly added extensions. The present application reduces the bandwidth used in transmitting a video frame buffer across an extension link. The contents of U.S. application Ser. No. 10/260,534 are assumed to be known to the reader. Products employing the "DVC encoding" of U.S. application Ser. No. 10/260,534 have been commercialized and should be considered prior art.

One of the aspects of the "DVC encoding" algorithm is that each side of the link always has a complete version of the previous frame to use as a reference. This allows each pixel in subsequent frames to be defined by commands:
  1. No change from pixel in previous frame (NO_CHANGE)
  2. Same as pixel in line above (COPY_ABOVE)
  3. Same as pixel to the left (COPY_LEFT)
  4. Series of pixels from a preceding known subset (MAKE_SERIES)
  5. New pixel (NEW_PIXEL)

Only the New Pixel option requires that a complete pixel be sent across the link. The first three require only that a short command message be sent indicating which type of encoding is used and how many consecutive pixels are encoded according to that encoding type. During encoding, the pixel data for both the current frame being compressed and, if applicable, the previous frame are read from memory. The current pixel is then compared against a reference pixel: PreviousPixel (akin to COPY_LEFT), PreviousLine (akin to COPY_ABOVE), and PreviousFrame (akin to NO_CHANGE). For each of the three directional commands, if the command is active and the associated comparison matches, then the command remains active and the prospective set increases by one more pixel. When all directional commands have terminated, due to either failures or end conditions, then the last active command is chosen as the encoding for that set of pixels.

In the event of a tie, then priority can be assigned in the following order: NO_CHANGE, COPY_LEFT, COPY_ABOVE, for example. This is the order historically used by previous DVC-encoding products, where it was arranged in terms of ease of decoding. However, other orders can be used. With double or triple buffering on each end, all three commands require similar effort by the decoder.

A single copy of the previous pixel (PreviousPixel) is kept for doing the COPY_LEFT comparison, and a full line of pixel data (PreviousLine) is kept for doing COPY_ABOVE comparisons. PreviousFrame pixels are being supplied by the memory subsystem along with the CurrentPixel.

Because NEW_PIXEL is the least efficient compression method, it is least favored and used only when the other compression types do not apply to a current pixel. Thus, a NEW_PIXEL determination always terminates a pixel encoding stream and sends the preceding command string for transmission and decoding. Then, NEW_PIXEL commands are accomplished on a pixel-by-pixel basis until another encoding type will again apply to a current pixel.

The MAKE_SERIES encoding type takes advantage of a sequence of pixels all being from a subset of preceding unique pixel colors. The standard mode is to use a two-color subset, which is ideal for text windows. This can be expanded up to four-colors or more (powers of two) depending upon the number of series comparators and registers the hardware implementation chooses to incorporate. A series comparator is required in the hardware for each pixel in the subset. As each pixel is processed (read from memory) it is compared against each of the pixels in the current series subset registers. All the comparisons are done in parallel, with the results being sent to the command process. As long as any one (and it should be no more than one) of the subset comparators is true, then the Series command is valid and can continue.

These first five command types are what are referred to as the original DVC-based commands which are described in greater detail in application Ser. No. 10/260,534.

This disclosure uses the original DVC-based commands in conjunction with more complex encoding commands. The more complex encoding commands are as follows:
  6. Delta from the same pixel in the previous frame (DELTA_NC)
  7. Delta from the pixel immediately above (DELTA_CA)
  8. Delta from the pixel immediately preceding (DELTA_CL)

Delta commands are an alternative to sending the full precision color, instead sending a much smaller value which is the difference (delta) between the real color and one of the neighboring colors used as a reference. In the case of 24-bit color, the full precision color is 24-bits whereas the delta is either 4 bits or 12 bits. There are several different types of delta commands that could be implemented. Some include a unique delta value for each color channel, while others contain a uniform delta that is applied to all color channels. The size (in terms of bits) of each delta can also vary according to the configuration.

The video compression unit can also use "Color reduction" to reduce the bandwidth usage. Color reduction removes some number of least significant bits from each color channel, thus increasing the likelihood that neighboring pixels will appear "identical" to the comparators, and also reducing the size of data required to send an uncompressed pixel.

BRIEF DESCRIPTION OF THE PRESENTLY PREFERRED EXEMPLARY EMBODIMENTS

Figure 4:
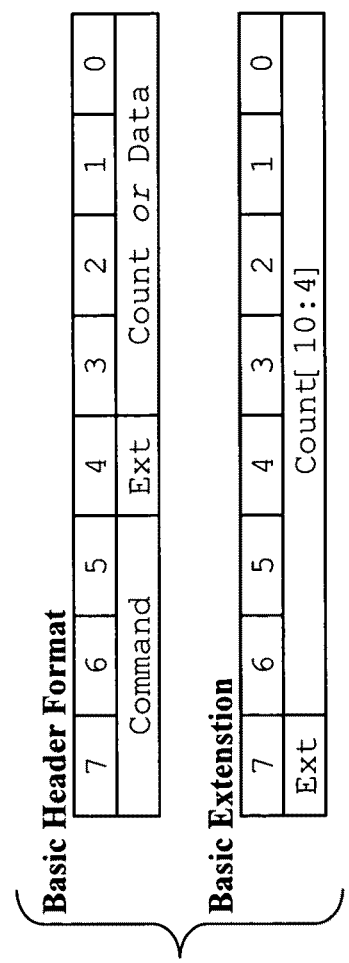
Figure 5:
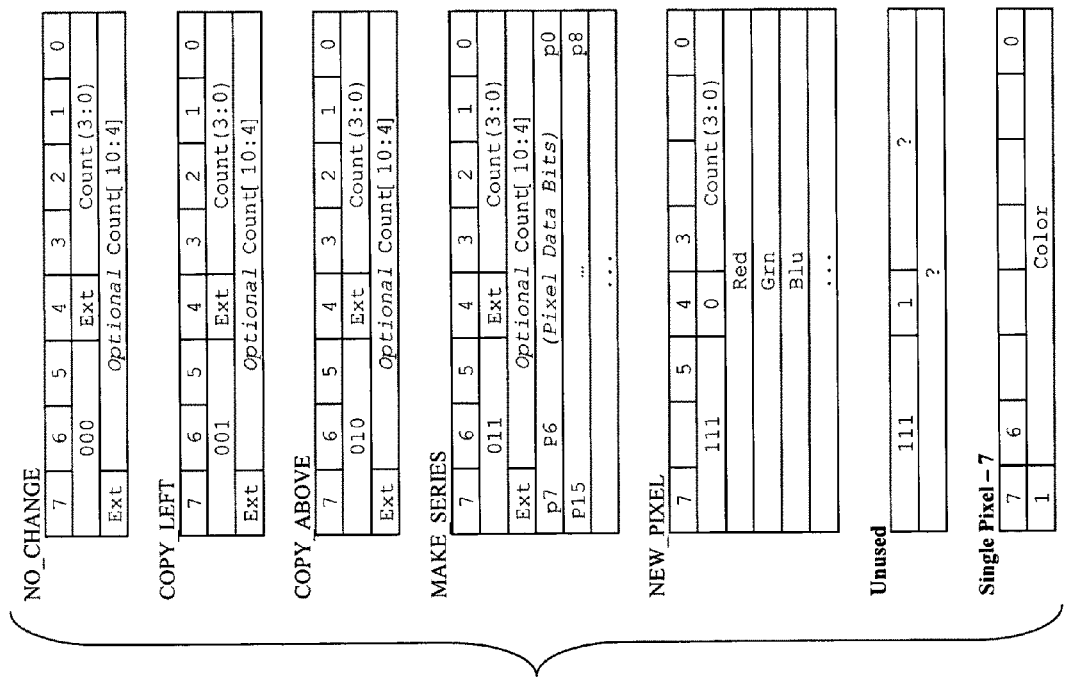
Figure 6:
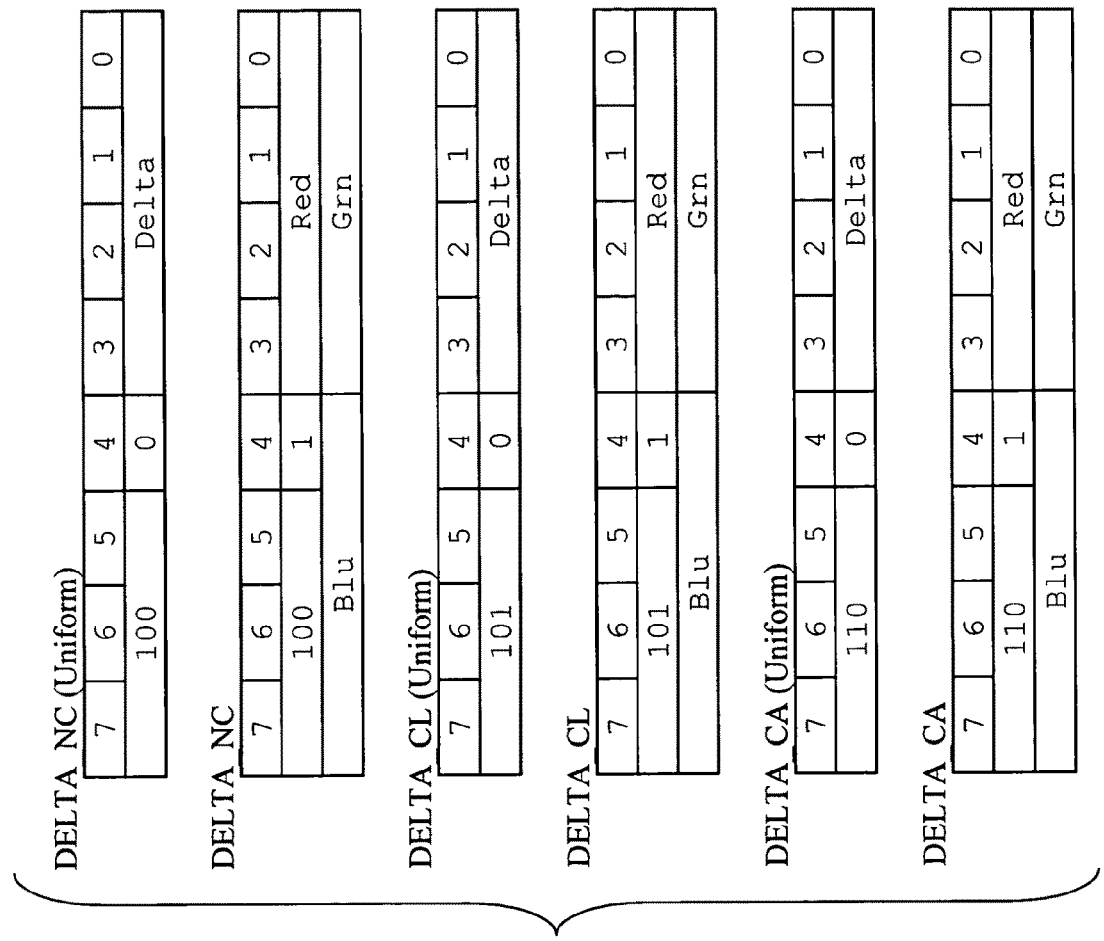
Figure 8:
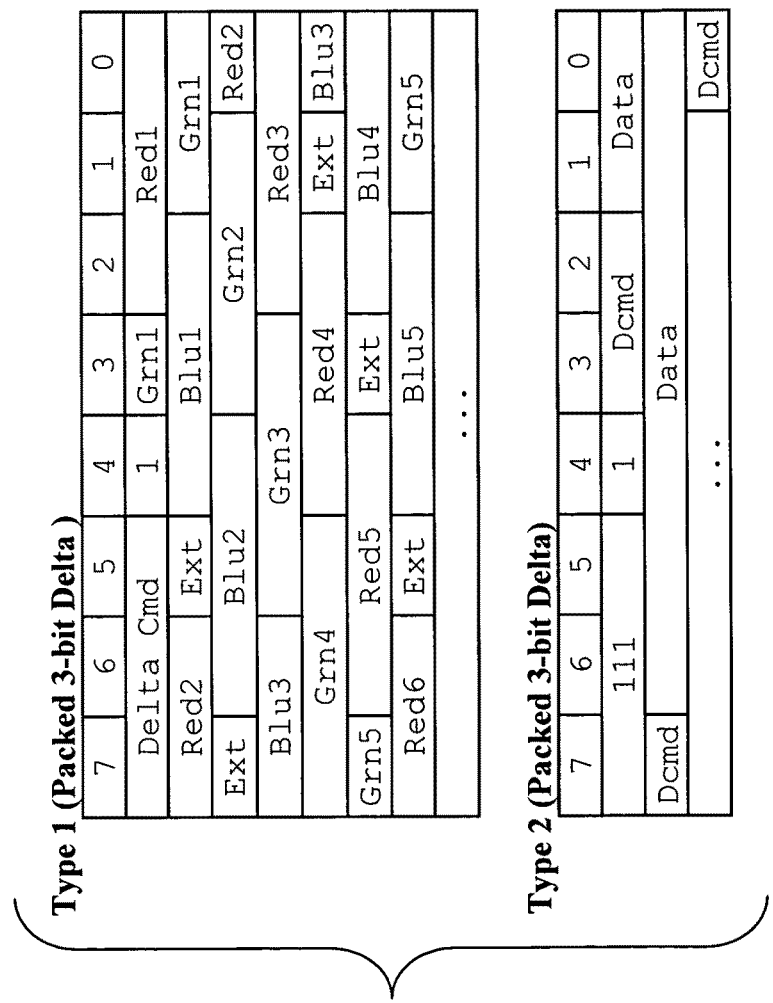
Figure 9:
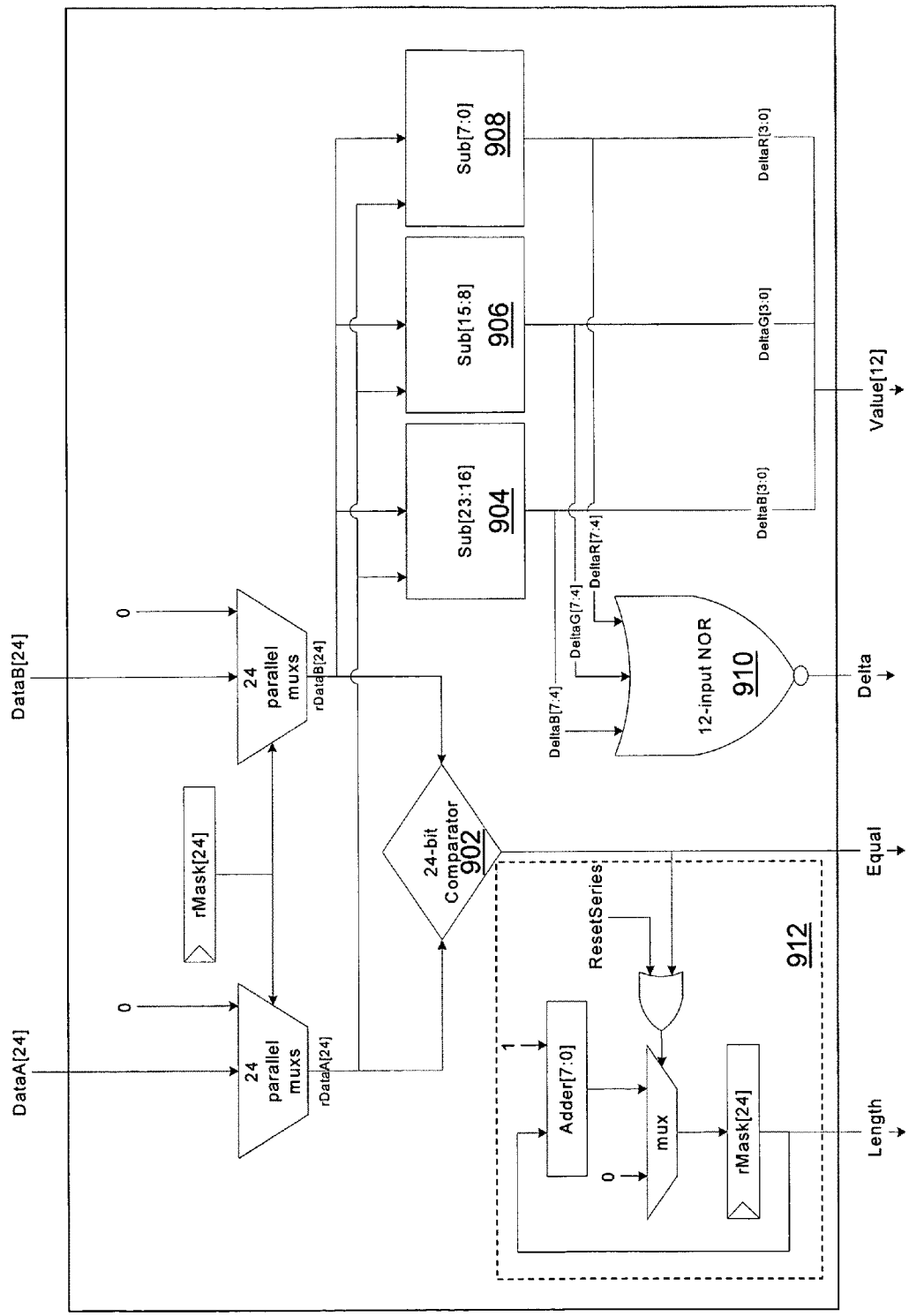
Figure 10:
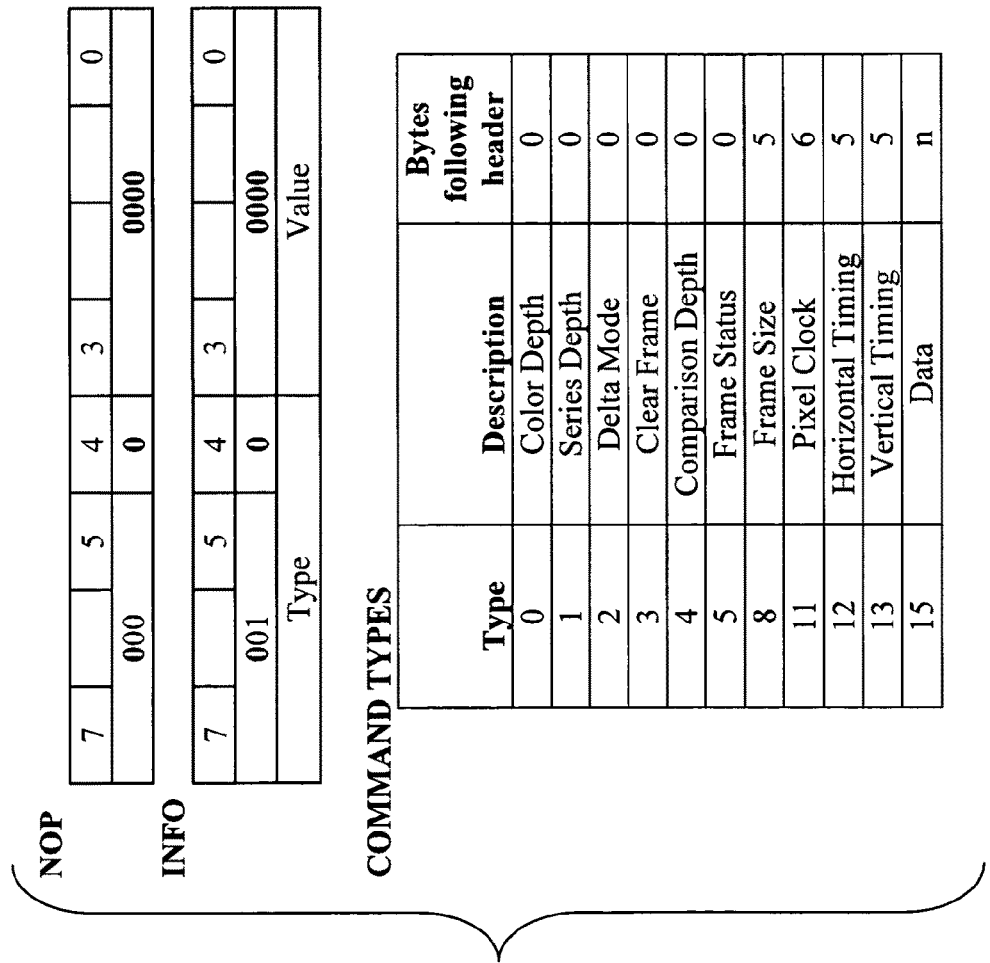
Figure 11:
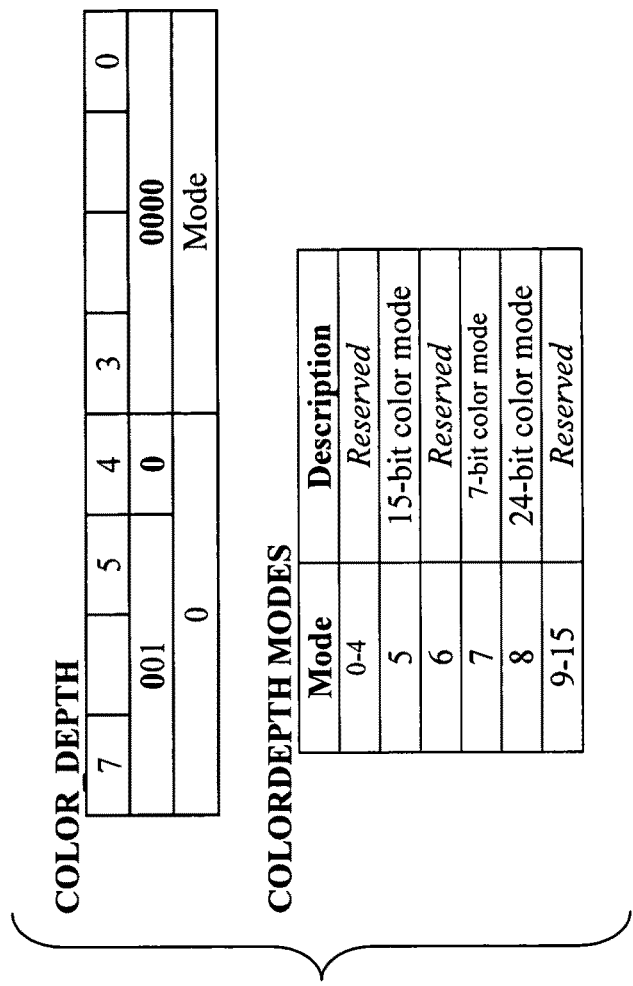
Figure 12:
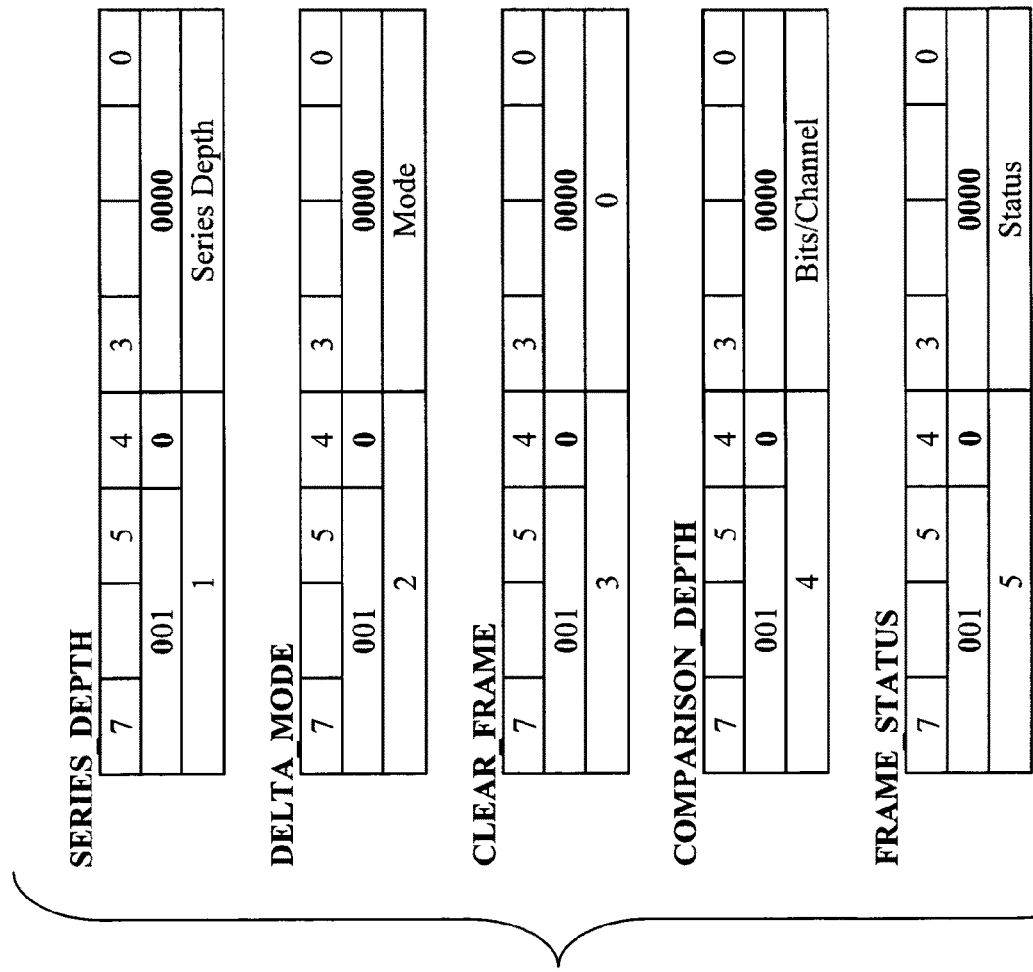
Figure 13:
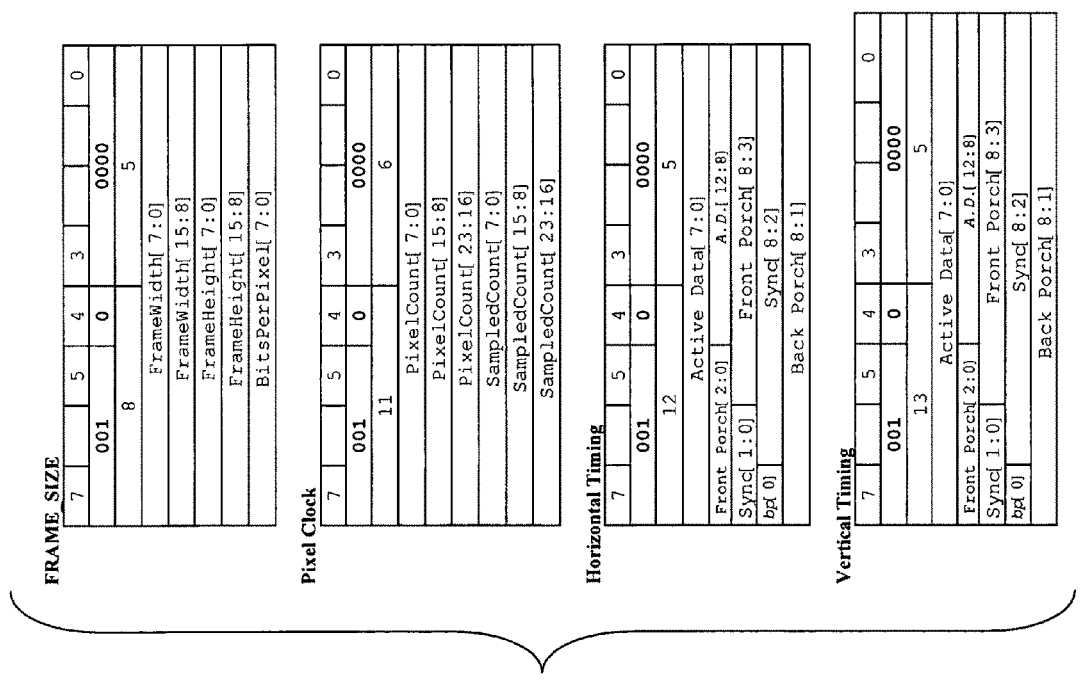

The following description, given with respect to the attached drawings, may be better understood with reference to the non-limiting examples of the drawing, wherein the drawings show:
  FIG. 1: An exemplary Video Compression System;
  FIG. 2: An exemplary Input Message Cell Format;

FIG. 3: An Exemplary Read Command Cell Format;

FIG. 4: An exemplary encoding Header Cell Format;

FIG. 5: Exemplary 8-bit Cells for the original DVC commands;

FIG. 6: Exemplary 8-bit Cells for the Delta Commands;

FIG. 7: Exemplary Delta Modes;

FIG. 8: Cells incorporating exemplary Delta Modes;

FIG. 9: An exemplary Comparison block;

FIG. 10: Exemplary Command Cell Formats and Table of Commands;

FIG. 11: Exemplary Color Depth Command Cell and Color Depth Mode Table;

FIG. 12: Exemplary Command Cells;

FIG. 13: Exemplary multi-byte Command Cells;

FIG. 14: An exemplary Command Data Cell; and

FIG. 15: Exemplary table of Core Clock Rates.

THE PRESENTLY PREFERRED EXEMPLARY EMBODIMENTS

FIG. 1 shows an exemplary Video Compression System 100 of a video system.

The Video Compression System 100 includes, in part, Command Process 102 and an Output Process 103. The Command Process 102 is the main process that responds to input from the Digital Video Input (DVI) Unit 104 and then starts processing a frame by making a request to the Memory Controller 106. Output Process 103 generates the output for the rest of the system. The Command Process 102 comprises a Message Interface 105 for receiving messages from the DVI Unit 104 and a Memory Interface 107 for communicating with Memory Controller 106.

The Message Interface 105 of the Command Process 102 initially receives an Input Message 101 from the DVI Unit 104. The message is a FIFO 8-bit message written by the DVI Unit 104. The most common messages fit into a single byte, while the rather infrequent timing values take multiple bytes and therefore multiple clocks.

The basic message header (the first byte of any message) of the input message 101 is shown in FIG. 2. The message header has a four-bit Type field (7:4) and a four bit Data field (3:0). The Type field specifies one of the following message types: Start Frame (0001), End Frame (0010), Horizontal Timing (0100), Vertical Timing (0101), and Pixel Clock Rate (0110). It should be noted that although five message types are currently defined more message types can be defined using the "Reserved" bit values.

The Data field of the header provides message information in accordance with the type of message. If the message type is a Start Frame or End Frame message, the message is contained within the Data field of the header.

Video Timing messages (Horizontal Timing, Vertical Timing, or Pixel Clock Rate) require 5 or 6 bytes of data after the message header. For these messages, the Data field of the header specifies the number of bytes to follow. The data structures for each type of Video Timing messages are shown in FIG. 2. The bytes are transmitted least significant byte and bit first, so using the Horizontal Timing as a reference bit 0 of ActiveData maps to bit 0 of the byte 0. ActiveData bit 7 maps to bit 7 of byte 0. ActiveData bit 8 maps to bit 0 of byte 1.

The Memory Interface 107 handles two types of data: a read command 108 sent to memory and the subsequently returned data (pixel data). The Command Process 102 uses a read command 108 to send a request to start reading pixel data from the current and previous frames and specify the size of the frame via width and height in pixels. The read command 108 is shown in FIG. 3 and contains Command type, FrameWidth, FrameHeight and two frame ID fields (one for the identification of the oldest previous frame to access and the other for the identification of the most current frame to access). These fields specify which pixels should be sent to the Command Process 102.

Once the Memory Controller 106 has received a read command 108 identifying pixels, the Memory Controller 106 should start filling the current data FIFO 110 and previous data FIFO 112 with pixel data from the two source frames. The data returned is assumed to be full 24-bit pixel data, and will be subsequently reduced by the Video Compression System 100 if necessary for lower color depths. The Memory Controller 106 writes the returned data directly to the current data FIFO 110 and previous data FIFO 112. The Command Process 102 monitors the empty flags of both current data FIFO 110 and previous data FIFO 112 to determine when each has pixel data to process. The flags may be combined using a Boolean OR operation to form one signal.

Once the Command Process 102 determines that there is pixel data to process, it then begins processing a frame of data (a set number of pixels) as it is available. The Command Process 102 is the core that makes the decisions as to which encoding to perform and sends the resulting decision, per active clock, to the Output Process 103. This decision may be any of the following:

1. Non-decision in the case where the pixel has been encoded into an actively-running command (nothing is sent to the Output Process 103 at this point)

2. A request to store a value in the output buffer (pixel, delta, or series)

3. A request to generate command output directly (typically completion of a directional command)

4. A request to generate a command, copying data from one of the output buffers (completion of a pixel, delta, or series-based command).

Two types of encoding the Command Process 102 can perform are shown in FIGS. 5-6. As in DVC-based encoding, the video packets are based on 8-bit cells, but other cell numbers can be substituted. There are several types of header cells defined in accordance with the commands shown in FIGS. 5-6, but each has the following basic format for the first byte (the header) which is shown in FIG. 4.

The first three bits (7:5) of the header are Command bits that specify the command. The fourth bit (4) is the Ext bit. When a header has the Ext bit set, then it is guaranteed that the command has at least one more byte to follow. The main purpose of the Ext bit is to extend the size of the count field for commands that contain a count i.e applying a command to be applied for a greater number of pixels than can be specified with four bits. The basic format of an Extension byte is shown in FIG. 4. The byte will have an additional Ext bit and 7 count bits. For these commands, subsequent cell(s) contain additional most significant bits of the count.

Thus, a single-byte command, which is limited to 16 ($2^4$) pixels, can be extended with a two-byte command to 2048 ($2^{11}$) pixels, with a three-byte command to 262144 ($2^{18}$) pixels, and four bytes (the most that should be required) to over 33 million pixels. Since four bytes is the most that should be required with current video coloration and video resolutions the command is typically limited to a maximum number of four bytes. Another reason for limiting the command to a maximum of 4 bytes is for the convenience of being able to write the command to a 32-bit wide FIFO in one cycle. It should be noted that although the command is typically limited to four bytes, the command can be extended to more bytes if necessary without departing from the scope of the present invention.

FIG. 5 shows the packet format of the original-DVC commands.

NO_CHANGE (NC) (Command=000) specifies that the Count number of consecutive pixels have not changed since the previous frame, and thus may be copied from the previous (reference) frame.

COPY_LEFT (CL) (Command=001) specifies that the Count number of consecutive pixels are identical to the pixel immediately to their left (the previous pixel).

COPY_ABOVE (CA) (Command=010) specifies that the Count number of consecutive pixels are identical to the pixel immediately above them (the previous line).

MAKE_SERIES (MS) (Command=011) represents a series of pixels of Count length that are each one of two possible colors. This is typically very useful for a window of single color text on a solid background. One data bit for each pixel represented specifies whether that pixel is the first or the second of the designated colors. In one embodiment, the designated colors are the two most recent and different colors encountered in a line. This can be the color of the immediately preceding pixel to the series (selected when a data bit is clear) and the color of the last pixel before it that was a different color (selected when a data bit is set). This can be easily extended to a larger depth by using multiple data bits to represent each pixel. The depth is defined by the implementation and is communicated downstream via the appropriate INFO command (FIG. 10).

Due to the size of the output holding buffer, the maximum series depth is typically 384 bits, or 12 four-byte words. This permits support for up to 384 pixels at a depth of 2 colors, 192 at 4 colors, 96 at 8 colors, etc. The maximum series length is limited to 256 in this implementation. It should be noted that the maximum series depth can be extended if the size of the output holding buffer is increased.

Since MakeSeries does not offer the most efficient compression, (that is the number of pixels that can be represented per byte) compared to the directional run-length encodings (NC, CL and CA), there are times when it is better to terminate a MakeSeries and switch to a directional encoding instead. It is not always easy to determine ahead of time whether it is better to terminate the MakeSeries or to stay in it. The present embodiment keeps a count of the consecutive NC, CL, and CA pixel comparisons during all operations, including MakeSeries. The counts are reset at the start of a MakeSeries, and then potentially after every 8 pixels processed by the MakeSeries command.

A directional command of 8 or more pixels is guaranteed to be no worse than another 8 pixels tacked on to the end of a MakeSeries. But, if the next pixels after those 8 can only be encoded with the same MakeSeries that was interrupted, then the interruption has actually required an extra MakeSeries header of at least one byte. For an interruption and subsequent resumption of MakeSeries, the set needs to be more than 32 pixels in length to assure that it is better to interrupt the MakeSeries. This allows for a potential restart using a 2-byte MakeSeries header for a count greater than 16.

One embodiment makes the decision based on a set size of 16. This leaves open the possibility of switching into and out of MakeSeries, but since that is expected to be a very infrequent occurrence, the simplification should be worth it.

After every 8 pixels processed by MakeSeries, the directional lengths will be checked. If any length is 16 or more, then a directional set could have processed the last 16 pixels. The MakeSeries count is reduced by 16, and the following directional command is seeded with a starting count of 16. This needs to be based on the 8-pixel boundaries within a MakeSeries. Clearing the directional check at the start of each byte if it is less than 8 takes care of this by eliminating any partial bytes.

The NEW_PIXEL command specifies the complete color values for a series of pixels that could not be otherwise compressed. The amount of data is equal to the number of bytes of color per pixel times the number of pixels encoded in this command. No attempt is made to extend this command beyond support for 16 pixels due to the amount of buffering required for the algorithm to buffer up pixels and then go back and fill in the header's count at a later time. Thus, NEW_PIXEL with the Ext set is currently unused.

In one example implementation, when the Video Compression System 100 is operating in 7-bit color mode, the NewPixel command has a set count of 1 and a NewPixel header cell is required for each pixel of data. This simple header cell is shown as "Single Pixel-7" in FIG. 5. This can result in up to a 2× bandwidth impact for 8-bit data, or 33% additional overhead for 24-bit data. The protocol therefore allows for a count to be used so that an implementation can choose to buffer up or otherwise delay sending the pixel data until a count can be determined. Again, imposing a limit of 16 pixels of data alleviates the buffering requirements and latency.

It should be noted that the PreviousLine buffer 130 may provide this capability if it is designed with two independent read ports. Otherwise a separate 16×24-bit FIFO will be required.

Due to the header format, 7-bit mode does not support NewPixel runs or the additional Delta Commands described below.

FIG. 6 shows the additional Delta commands. These command formats shown in FIG. 6 are tailored to 24-bit and 15-bit color modes.

The Delta commands attempt to limit the number of bits transmitted when the directional-based commands fail and an inefficient NEW_PIXEL has to be sent. The Delta commands operate under the assumption that the pixel may be close in color to one of its neighbors. Rather than sending the NEW_PIXEL, a simple reference to that neighbor (via the command field) and a signed color delta may reduce the data to as little as 25% of what would otherwise have been required for the NEW_PIXEL command, if the pixel is close in color to one of its neighbors.

The Delta commands as described below can either specify the difference in color between two pixels as the absolute difference (the four-bit signed difference between two 24-bit numbers) or the difference for each color channel (three four-bit differences for each color). As shown in FIG. 6 when the Ext bit is not set (a "0" in bit 4), a single delta value is used as the signed difference between the 24-bit string of the current pixel and the previous pixel. When the Ext is set (a "1" in bit 4), a delta value for each color channel is provided. Delta values are added to respective values from the pixel which is compared to the current pixel to generate the color of the current pixel. The Delta commands can use signed 4-bit values supporting a range of [−8,7] or another range depending on the Delta Mode.

DELTA_NC specifies that this pixel is only slightly different from the same pixel in the previous frame, that is, it is different only by the specified Delta.

DELTA_CL specifies that this pixel is only slightly different from the previous pixel, again by the specified Delta.

DELTA_CA specifies that this pixel is only slightly different from the pixel immediately above, again by the specified Delta.

The Delta commands shown in FIG. 6 are the standard Delta Commands. As described below, there are many Delta modes. The Delta Commands are enabled and configured according to the DeltaMode. The Delta modes that are defined are shown in FIG. 7.

The Delta commands shown in FIG. 6 are Mode 0, the standard format as shown above with a single pixel represented per command. Modes 4, 5, 8, and 9 are embodiments of delta commands employing 3-bit delta values. Modes 4, 5, 8 and 9 are distinguishable by the range of delta values (i.e. [−4,3] or [0,7]) and the type of packaging scheme employed (i.e. Type 1 or Type 2). Type 1 and Type 2 are shown in FIG. 8 and are additional formats that support packing multiple pixel deltas into a single command, thus reducing overhead. Modes 4 and 5 are Type 1 and Modes 8 and 9 are Type 2.

In Type 1, the Ext (extension) field is used to identify whether another pixel follows. When a cleared Ext field is encountered (Ext=0), then the command has ended, and the unnecessary bits in the current byte (if any) are ignored. As shown in FIG. 8, using Type 1 allows two pixels to be represented by three bytes. It would require four bytes to represent two pixels if the delta command had to be sent for each pixel. Likewise, five pixels can be represented by seven bytes instead of ten.

Type 2, takes advantage of the unused Command=111 and Ext=1 shown in FIG. 5. In Type 2, when Command=111 and Ext=1, one of Delta NC, Delta CL, or Delta CA applies. A two-bit command (Dcmd) embedded within the stream for each pixel determines which one of the Delta NC, Delta CL, or Delta CA applies and replaces the single-bit extension field of the previous format. It is particularly useful for long runs of deltas that are a mix of multiple directions. Dcmd specifies one of: Delta NC (00), Delta CL (01), Delta CA (10), or termination of command (11).

Type 2 Packed 3-bit Delta becomes a better compression option over a string of 4-bit non-uniform Deltas as soon as two consecutive Deltas are encountered. With Delta data being written to the DeltaBuffer, the only additional information necessary is whether any of the current consecutive Deltas has exceeded 3-bit format. The decision to switch to packed deltas is made when the second consecutive Delta is encountered. At this time, the type of all subsequent Deltas will need to be written, along with the 3-bit data fields, to the 12-bit DeltaBuffer. The Output Process 103 can then handle using the current DeltaType and ConsecutiveDeltas count to parse and output the DeltaBuffer accordingly.

FIG. 7 also shows Mode 1 which is similar to Mode 0 except that the range is [0,15] instead of [−8,7]. Mode 1 is useful for adding a delta value to previously truncated colors.

The Command Process 102 determines which of the DVC or Delta commands are applicable through the three directional comparison blocks 114, 116 and 118, which send information to the Command Process 102. The comparison blocks 114, 116, and 118 operate in parallel, each comparing the current pixel (cPixel) with their respective reference pixel and sending a TRUE signal to the Command Process 102 if the pixels are determined to be equivalent. The comparison blocks also compute deltas of each channel and send that information packed into a 12-bit value, for example, for use by the Command Process 102. A separate Delta flag is passed in addition to the 12-bit value in order to indicate whether the observed deltas were within the current range or not. This keeps the Command Process 102 from having to decode a delta value of all zeros.

FIG. 9 shows an exemplary Delta comparison block. Each Delta comparison block receives two 24-bit strings (DataA[24] and DataB[24]), one representing a present pixel and another representing a previous pixel. The bit strings are compared using a 24-bit comparator 902. The 24-bit comparator 902 outputs a true value if the bit strings are equal. The exemplary Delta comparison block also includes three 8-bit subtraction blocks 904, 906, and 908 for subtracting 8-bit color values of a 24-bit number representing the current pixel from the respective 8-bit color values from a 24-bit number representing the previous pixel. The four most significant bits from the subtraction blocks 904, 906, and 908 are sent to 12-Bit NOR gate 910 which determines whether a delta condition exists, i.e. the four most significant bits of each color channel are equal, i.e. the result of subtraction is 0000. The subtraction blocks 904, 906, and 908 also transmit the delta value (i.e. the difference between the four least significant bits) for each color channel to the Command Process 102. It should be noted that although the exemplary Delta comparison block are configured for a 24-bit color implementation and a delta mode where a four-bit delta value is generated for each color channel, this is simply for explanatory purposes and not intended to be limiting. One ordinary skill in the art would appreciate other hardware configurations could be used for the current implementation and that other hardware configurations may be necessary for other implementations. Block 912 is optional logic that is used for make series determination.

The Video Compression System 100 also has some number of series comparison blocks 120 and 122 (with no delta computation) operating in parallel to determine whether a make series condition occurs. Comparison blocks 120 and 122 compare the current pixel with the most recent unique pixels and send a TRUE signal to the Command Process 102 if the pixels are equivalent. It should be noted that although the present embodiment is using only two series comparators for the two most recent pixels, more comparators could be used.

The Command Process 102 tracks which commands (signals) are permissible (based on position within a frame, etc), which ones still have active runs, and how many pixels are in the current run. When the Command Process 102 determines that a run ends, the end of the line is reached, or the end of a frame is reached, then the appropriate command 124 and data 126 are generated and sent to Output Process 103. The Command Process 102 also updates PreviousPixel 128 and the current location in the PreviousLine buffer 130.

Position is tracked by XPos variable 132 and YPos variable 134 to count horizontal and vertical positions within a frame in units of pixels. These positions are used to address the current location within the PreviousLine buffer 130 and to determine line and frame boundaries.

The Output Process 103 generates the output 136 to the rest of the system. If the Output Process 103 can not write, or is busy writing multiple pieces of data, and can not accept input, then everything else in the unit must stall waiting. The reason for this separate process is because of the buffered nature of the outgoing commands. The commands are buffered so that the header can be filled in once the size (count) is known. Without this separate process, the main Command Process 102 would take as much as twice as long to process pixels. With this dual process implementation, both processes operate in parallel in a pipelined fashion.

The Output Process 103 tracks the compression performance during each frame in terms of the number of bytes required to compress a number of pixels. This ratio can be tracked after each command, and when it exceeds a threshold (defined via an applet by the user), the Output Process 103 will inform the Command Process 102 that it needs to reduce the color depth in an effort to conserve bandwidth. The Output Process 103 will define and track BytesPerFrame and PixelsPerFrame, both of which are reset at the end of each frame. To avoid erroneous decisions, the values are not actually used until the PixelsPerFrame indicates that the process is at least one line into the frame.

The most likely threshold is a limit on the number of Bytes/second. This can be translated to a ratio of bytes/pixel (BP) as follows:

$$X \text{ bytes/second} \geq (\text{width} * \text{height}) * BP * fps$$

$$BP = X/(\text{width} * \text{height} * fps)$$

For a maximum bandwidth allocation of, say, 8 MBps, using 1024×768 at 30 fps, this would equate to a Byte/Pixel ratio of:

$$BP \text{ ratio} = 8 M/(1024*768*30) = 0.34$$

The straightforward implementation would multiply the current pixel count by this value and then see if the result is still greater than the current byte count. If it is not, then the bandwidth is being exceeded and the Command Process 102 needs to throttle back if possible.

Including a floating-point multiplier, however, is likely unnecessary. Reversing the ratio and defining it as pixels per byte allows for integer multiplication with a little less accuracy on the desired MBps rate.

$$PB \text{ ratio} = 1024*768*30/8 M = 2.94 = 3 \text{ (is actually 7.86 MBps)}$$

Rounding this ratio up to the nearest integer is the conservative approach, but it could potentially give up a significant amount of bandwidth.

The Video Compression System 100 can also use "Color reduction" to reduce the bandwidth usage. This is separate from the operating system based color depth setting that the user will have configured for the computer. Regardless of the operating system setting, the Video Compression System 100 is storing 24-bit color data. The Video Compression System 100 will likewise read 24-bit color data from memory, but color reduction will remove some number of least significant bits from each color channel (e.g setting them to zero), thus increasing the likelihood that neighboring pixels will appear "identical" to the comparators 114, 116, and 118, and also reducing the size of data required to send an uncompressed pixel.

The Video Compression System 100 could be designed to operate on 8 or 16-bit color throughout, but since it needs to handle 24-bit color at high resolution and frame rates, there is nothing to be gained by trying to handle the lower color depths natively. This would simply complicate the implementation for something that is expected to be rare. If it were the only way to support the higher resolutions, it may be desirable.

It also may be desirable for an embodiment which has no intention of supporting 24-bit color, but such implementation would need to have global changes made throughout the Video Compression System 100 to best optimize the performance and minimize gate count and cost.

Besides the operating system and native color depths, there are a couple of other terms related to color depth. "Comparison depth" is the term used to describe the number of most significant color bits used (per color channel) when comparing two colors. There is also the current color depth (not the native depth) of the subsystem, which is what is referred to when the Video Compression System 100 references "Color Depth." The comparison depth does not necessarily have to be the same as the ColorDepth. For instance, comparisons can be done with 15-bit color (5 bit per channel), and yet 24-bit pixels can be sent via the Delta and NEW_PIXEL commands. This will result in somewhat more than 215 colors potentially displayed on the screen, but will reduce the color fidelity by slightly changing some neighboring colors. The advantage is that compression is potentially improved via the relaxed equality requirement.

The valid ColorDepth values are limited by the byte nature of the video protocol to the following: 24-bit, 15-bit, and 7-bit. The comparison depths that can be used to improve comparisons are: 3, 6, 9, 12, 15, 18, 21, and 24. The depth could be varied per channel.

The comparison depth to be used by the comparison logic is held in the ComparisonDepth register. This specifies the depth of a single channel and is used to create a mask that is applied to each pixel being fed into the comparator source registers.

The ColorDepth register controls how the Output Process 103 constructs NEW_PIXEL commands, and how logic in the rest of the system operates. If the ColorDepth is set to 24-bit or 15-bit modes, then the NEW_PIXEL command is constructed with an 8-bit header (supporting up to 16 pixels) and 24-bits (or 15-bits) of color data per pixel.

For a ColorDepth of 7, DVC algorithms have typically used a special mapping of the color ranges. That is not done in this current implementation that favors color masking. Instead, 7 bits are used with 2-bits for each of red and blue, and 3 bits for green. Green is commonly favored in digital imaging color formats due to the fact that the human eye more readily detects green and the subtle shading variations than it does either red or blue. This results in a 7-bit protocol with a NEW_PIXEL that is constructed with a single-bit header and 7-bits of color data per pixel.

Both ColorDepth and ComparisonDepth registers are part of the state that is configurable by the user. The defaults can be controlled via jumpers or hard-coded into the hardware. The user should be able to adjust these either directly or indirectly via an applet that lets them adjust for bandwidth, etc. This applet communicates with the hardware through the Control Unit 102. When these values are being set, it must be assured that the video subsystem is either idle, or the values must be staged so that the changes are not made until the video subsystem is at a point where it can deal with the change.

The Video Compression System 100 needs to know the pixel depth (number of bits) and frame size (height and width in terms of pixels) to account for the line width and any padding that may be necessary at the end of a line or frame. It also must know the start of each frame since COPY_ABOVE may be turned off for the first line of a frame, and COPY_LEFT may be turned off for the first pixel of each line.

Note that this particular implementation does not suppress COPY_ABOVE or COPY_LEFT, but instead compares to the last row of the previous frame or the last pixel of the previous line respectively. In the event of a timing change which results in starting with a clean slate after an EndFrame: Clear message, left and above are compared against black pixel values of 0x000000.

FIG. 10 shows control commands that are generated at the Command Process 102. Control commands need to be distinguished from the encoding commands. Control commands are recognized by the fact that the least significant 5 bits are all 0, indicating a zero count, and the most significant bit is clear indicating that it is a command that requires a count (versus a Delta or New Pixel command with a color).

The group of control commands shown in FIG. 10 is grouped under the INFO_HEADER with sub-header byte that specifies Type and a Value for the Type. Types are defined in the table shown in FIG. 10. Value is specific to each Type, but in general is the number of bytes following this two-byte header (not including the two-byte header) for commands longer than this header. For commands consisting only of the two bytes of this header, value is a 4-bit data value.

FIG. 11 shows the INFO_HEADER for each Type.

The ColorDepth command is used to specify the color mode. Currently, 24-bit, 15-bit, and 7-bit color modes are supported in this implementation. ColorDepth modes are defined in FIG. 11. Color Depth is provided to the Video Compression System 100 via a configuration register, and does not come in through the message stream. It should be noted that although the present embodiment only defines three color modes, more color modes could be defined in the future without departing from the scope of the present invention.

The SERIES_DEPTH command shown in FIG. 11 is used to specify the width of the bit-field used to identify the color of each pixel in a Series command. The default depth is 1, which allows for series composed of 2 colors. The maximum depth supported varies by implementation, but in the preferred embodiment, a depth of 4 bits (16 colors) is the maximum desirable.

DELTA_MODE specifies the delta mode to be used for all subsequent commands. There are no data bytes following.

The CLEAR_FRAME command is used to indicate that a previous frame is to be cleared to zeros, or at least that the next frame should be compared to all zeros rather than the contents of the previous frame.

The COMPARISON_DEPTH command is used to control the number of bits that are used when comparing pixels to each other. This is specified in terms of bits/channel. Comparison Depth is provided to the Video Compression System 100 via a configuration register, and does not come in through the message stream.

The FRAME_STATUS command is used to convey the status of a frame, signifying either successful completion or the need to abort further processing of the current frame. A Status field of 0 indicates success, while 1 indicates the need to abort.

FIG. 12 shows the FRAME_SIZE command. FrameWidth and FrameHeight specify the dimensions of the subsequent frames in terms of pixels, ranging from 0 to 65,535. Implementations will generally have a smaller maximum supported value on the order of 4,000 or less depending upon the application. BitsPerPixel specifies the number of bits used to define the color per pixel. This typically is in the range of 24 bits or less, although larger depths are possible in the future. This is fixed to 24-bits for this implementation.

The only intent for this Frame Size message is to more neatly convey the Frame Size information to the Video Decompression Unit (VDU) (not shown) on the other side of the link. This unit typically gathers the separate pieces of data from the timing messages, which are destined for the DVI Output Unit on the far side of the link. Packaging all the information in this message (which is bound for the VDU) allows the VDU to ignore the timing messages. The fields of the FRAME_SIZE command are defined as follows:

Pixel Clock: This command is used to transmit the values necessary to regenerate a pixel clock for the display on the other side of the link.

Horizontal timing: This command is used to transmit the horizontal display timing values to the other side of the link.

Vertical timing: This command is used to transmit the vertical display timing values to the other side of the link.

FIG. 13 shows a general data packet. This general purpose data packet is used to send data across the link. It is assumed that the other side of the link can parse the data.

It should be noted that maximum compression is achieved when an entire frame can be encoded as one NoChange message. However, in the double-buffered architecture of the present embodiment such encoding would result in a full frame-time of latency (on the order of 16 ms) between the times that the Video Compression System 100 starts processing a frame and when the VDU starts to receive the results of that processing. Instead of letting a run-length command build throughout the entire frame, the commands are limited in size and sent periodically throughout the frame. For simplicity, this is done at the end of each line. If absolute performance becomes more important than latency, this could be fine tuned in numerous ways.

It should be noted that due to the architecture of the Digital Input Unit (DIU) (not shown), the Video Compression System 100 may already be processing a frame when it receives information indicating that the resolution is changing. This information will be in the form of an EndFrame message with the Clear bit set.

When the Video Compression System 100 finishes a frame, it should see an EndFrame message with a 0 Clear bit in its incoming FIFO. If it instead sees an EndFrame with Clear bit or any Timing message at the front of its FIFO, then it knows that the previous frame (the one it just finished processing) was invalid. The Video Compression System 100 then sends a FrameAbort message to the VDU to indicate that the preceding frame should not be displayed. If there is no message in the incoming FIFO, the Video Compression System 100 waits until one is present.

If the resolution has decreased, then the Video Compression System 100 will have attempted a much larger read to memory than what memory will actually be able to supply. The Memory Interface Unit (MIU) 107 assures that the Video Compression System 100 read pointer trails behind the DIU write pointer so that the Video Compression System 100 does not overtake the data being written. The early termination of DVI 104 data going to memory 106 will mean that the DIU write pointer will stall for the timeout period, causing the Video Compression System 100 to stall as well waiting on data. When the Memory Interface Unit 107 decides to terminate the request, it will simply abort the processing of the Video Compression System's 100 read request.

The Video Compression System 100 must continually monitor its incoming command FIFO while processing pixels coming from memory 106. If the Video Compression System 100 sees an EndFrame, Clear or Vertical Timing message from the DIU, it immediately terminates processing of the current frame and sends the FrameAbort message to the VDU. The Video Compression System 100 also immediately sends a Purge Frame message to the MIU 107. This message tells the MIU 107 to stop sending further data to the Video Compression System 100 for the frame currently in progress. The MIU 107 subsequently will flush any data remaining to be read from the DIU. The Video Compression System 100 is responsible for flushing the Current and Previous FIFOs after notifying the MIU 107 to stop adding to them.

The Video Compression System 100 needs to process a pixel per clock with per-frame latency on the order of only a few pixels and no latency between pixels. This depends heavily on the memory controller 106 being able to provide input data at the necessary rate, and also on the output not backing up and forcing a stall.

Assuming that the above criteria is met, and that a pixel can be processed per clock, then the clock rate is based on the number of pixels per frame and the desired frame rate. The table in FIG. 15 shows the rates required for various combinations.

Allowing for some overhead, the table shows that an 80 MHz core clock would be sufficient for 30 fps HDTV. A more likely target would be something on the order of 100-125 MHz, which would handle even QXGA at 30 fps, and would support HDTV at over 40 fps. While very high resolutions at very high frame rates may require too high a clock rate to be commercially/economically feasible, advances in processing rates and costs will eventually enable even those very high resolutions and frame rates to be implemented with economically feasible off-the-shelf products. Likewise, clock rates that are border-line for commercial/economic reasonableness today will be economically feasible with off-the-shelf products even sooner.

Being able to compress a single frame at a 60 fps rate improves the latency perceived by the end user, and is therefore a worthwhile goal even if frames are intentionally dropped or are otherwise not transmitted 60 times per second.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of encoding video, comprising the steps of:
predefining a set of pixel-copy commands based on frame location relationships between the present pixel and other pixels;
for the present pixel, encoding according to a hierarchy selection from:
(1) copy-pixel encoding that makes data packets defining the number of consecutive pixels of that can be represented by copying the color of a respective pixel with a frame location relationship;
(2) individually colored pixel encoding that makes a data packets each defining each color of the pixels in said given set of consecutive pixels;
(3) delta value pixel encoding that makes a data packets each defining the difference between the color a current pixel and a respective pixel with a frame location relationship; and
(4) two-color series pixel encoding that makes a data packet including each bit indicating which color, from a two-color set, applies to each of the pixels in said series of consecutive pixels, wherein pixels in said given set of consecutive pixels are comprised of colors from a two color set.

2. A method according to claim 1, wherein the encoding includes making fixed-size data packets including an opcode portion that identifies said copy-pixel encoding, delta value pixel encoding, two-color series pixel encoding, and individually colored pixel encoding and a payload portion.

3. A method according to claim 2, wherein for at least some of the fixed-size data packets:
said opcode includes one bit identifying whether the corresponding data packet be associated with said individually colored pixel encoding;
said opcode of the data packet associated with said copy-pixel encoding and said two-color series pixel encoding includes two additional bits identifying the hierarchy selections associated with three different pixel copy commands and the two-color series pixels command; and
said payload portion has a length of at least n-bits.

4. A method according to claim 3, wherein others of the fixed-size data packets include an extension bit linking payload of the data packet with the payload of a previous data packet and including a payload of greater than n-bits.

5. A method according to claim 4, wherein others of the fixed-size packets include an extension bit linking the payload of the current data packet with the payload of the next data packet, which next data packet then includes a payload of greater than n-bits.

6. A method of compressing a video frame comprising pixels defined by n-bit color values partitioned into three $y_1$-bit, $y_2$-bit, and $y_3$-bit channels, comprising the steps of:
for the $y_1$-bit channel:
for a plurality of directional relationship types of a current pixel relative to a reference pixel, generating a $(y_1-x_1)$-bit delta value by determining a difference between a $y_1$-bit reference pixel color value and a respective $y_1$-bit current color value, where $x_1$ is a predetermined number of significant bits of $y_1$;
for the $y_2$-bit channel:
for a plurality of directional relationship types of a current pixel relative to a reference pixel, generating a $(y_2-x_2)$-bit delta value by determining a difference between a $y_2$-bit reference pixel color value from a respective $y_2$-bit current color value, where $x_2$ is a predetermined number of significant bits of $y_2$;
for the $y_3$-bit channel:
for a plurality of directional relationship types of a current pixel relative to a reference pixel, generating a $(y_3-x_3)$-bit delta value by determining a difference between a $y_3$-bit reference pixel color value from a respective $y_3$-bit current color value, where $x_3$ is a predetermined number of significant bits of $y_3$;
if the $x_1$, $x_2$, and $x_3$ significant bits of respective $y_1$-bit, $y_2$-bit, and $y_3$-bit channels are equal for the n-bit reference pixel color and the n-bit current color value, determining the n-bit current color value by adjusting each channel of the n-bit reference pixel color value by the respective delta values.

7. A method dynamically adjusting the performance of a video compression system that compresses a video frame comprising pixels defined by n-bit color values channels by comparing the x most significant n-bits of current pixel to the respective x most significant bits of a reference pixel, comprising the steps of:
specifying a bytes per pixel ratio (BP);
for a group compressed pixels in video frame, determining an actual number of bytes required to compress the group of pixels;
determining a threshold number of bytes by multiplying BP and the number of pixels in the group;
comparing the actual number of bytes to the threshold number of bytes; and
if the actual number of bytes is greater than the threshold number of bytes, reducing x.

8. The method of 7, wherein BP is defined by the following equation:
BP=(bytes/second)/(frame width*frame height*frames per second); and wherein the step of setting a bytes per pixel ratio (BP) further comprises setting the (bytes/second) value.

* * * * *

UNITED STATES PATENT AND TRADEMARK OFFICE
CERTIFICATE OF CORRECTION

PATENT NO. : 8,660,194 B2
APPLICATION NO. : 12/458818
DATED : February 25, 2014
INVENTOR(S) : Gary William Shelton et al.

It is certified that error appears in the above-identified patent and that said Letters Patent is hereby corrected as shown below:

In the Claims

Column 13, line 24, cancel the text beginning with "1. A method of encoding video" and ending with "color set" in column 13, line 46, and insert the following claim:

--1. A method of encoding video, comprising the steps of:
  predefining a set of pixel-copy commands based on frame location relationships between the present pixel and other pixels;
  for the present pixel, encoding in a video encoder according to a hierarchy selection from one of:
  (1) copy-pixel encoding that makes data packets defining the number of consecutive pixels that can be represented by copying the color of a respective pixel with a frame location relationship that is redundant to the respective pixel;
  (2) individually colored pixel encoding that makes data packets each defining each color of the pixels in said given set of consecutive pixels;
  (3) delta value pixel encoding that makes data packets each defining the difference between the color of a current pixel and a respective pixel with a frame location relationship; and
  (4) a series pixel encoding that makes a data packet including bits each indicating which color, from an n-color set, applies to each of the pixels in said series of consecutive pixels, wherein pixels in said given set of consecutive pixels are comprised only from a set of n number of unique colors, the bits of the data packet representing a consecutive series of color identifiers in which (1) the color identifiers correspond respectively to the set of n number of unique colors, (2) the consecutive series is identical in length to the consecutive run of pixel colors, and (3) the color identifiers are ordered in the consecutive series to correspond to an order of the consecutive run of pixel colors.--.

Column 14, line 37, Claim 6, after "mining" insert --in a video encoder--.
Column 14, line 42, Claim 7, delete "values" and insert --value--.
Column 14, line 43, Claim 7, insert --a-- after "n-bits of".
Column 14, line 47, Claim 7, insert --of-- after "group".
Column 14, line 55, Claim 7, insert --in a video encoder-- after "reducing x".

Signed and Sealed this
Ninth Day of June, 2015

Michelle K. Lee
*Director of the United States Patent and Trademark Office*